United States Patent
Leibovitz

(10) Patent No.: US 10,796,092 B2
(45) Date of Patent: *Oct. 6, 2020

(54) TOKEN MATCHING IN LARGE DOCUMENT CORPORA

(71) Applicant: NETAPP, INC., Sunnyvale, CA (US)

(72) Inventor: Guy Leibovitz, Tel Aviv (IL)

(73) Assignee: NETAPP, INC., Sunnyvale, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/271,839

(22) Filed: Feb. 10, 2019

(65) Prior Publication Data

US 2020/0065371 A1 Feb. 27, 2020

Related U.S. Application Data

(63) Continuation of application No. 16/108,497, filed on Aug. 22, 2018, now Pat. No. 10,248,646.

(51) Int. Cl.
| | |
|---|---|
| *G06F 40/284* | (2020.01) |
| *G06F 17/18* | (2006.01) |
| *G06F 16/31* | (2019.01) |
| *G06F 16/33* | (2019.01) |
| *G06F 40/242* | (2020.01) |

(52) U.S. Cl.
CPC .......... *G06F 40/284* (2020.01); *G06F 16/31* (2019.01); *G06F 16/3331* (2019.01); *G06F 17/18* (2013.01); *G06F 40/242* (2020.01)

(58) Field of Classification Search
CPC ........ G06F 40/284; G06F 17/18; G06F 16/31; G06F 16/3331; G06F 40/242
See application file for complete search history.

(56) References Cited

U.S. PATENT DOCUMENTS

| | | |
|---|---|---|
| 6,169,969 B1 | 1/2001 | Cohen |
| 7,305,612 B2 | 12/2007 | Chakraborty |
| 7,623,710 B2 | 11/2009 | Simard et al. |
| 8,572,126 B2 | 10/2013 | Flor |

(Continued)

FOREIGN PATENT DOCUMENTS

CN 106874458 A 6/2017

OTHER PUBLICATIONS

International Search Report and Written Opinion for PCT Application No. PCT/US2019/047527 dated Oct. 14, 2019, 11 pages.

(Continued)

*Primary Examiner* — Brian L Albertalli
(74) *Attorney, Agent, or Firm* — Haynes and Boone, LLP

(57) ABSTRACT

A method comprising receiving a dictionary comprising a plurality of entities, wherein each entity has a length of between 1 and n tokens; constructing a probabilistic data representation model comprising n Bloom filter (BF) pairs indexed from 1 to n; populating said probabilistic data representation model with a data representation of said entities, wherein, with respect to each BF pair indexed i: (i) a first BF is populated with the first i tokens of all said entities having at least i+1 tokens, and (ii) a second BF in populated with all said entities having exactly i tokens; receiving a text corpus, wherein said text corpus is segmented into tokens; and automatically matching each token in said text corpus against said populated probabilistic data representation model, wherein said matching comprises sequentially querying each said BF pair in the order of said indexing, to determine a match.

18 Claims, 5 Drawing Sheets

(56) References Cited

U.S. PATENT DOCUMENTS

| | | | |
|---|---|---|---|
| 8,949,371 | B1 | 2/2015 | Shrowty |
| 9,361,327 | B1 | 6/2016 | Chen et al. |
| 9,965,546 | B2 | 5/2018 | Furst et al. |
| 10,248,646 | B1 | 4/2019 | Leibovitz |
| 2006/0072582 | A1 | 4/2006 | Bronnimann et al. |
| 2008/0111718 | A1 | 5/2008 | Lin et al. |
| 2010/0125594 | A1 | 5/2010 | Li et al. |
| 2010/0332765 | A1 | 12/2010 | Cypher |
| 2011/0078152 | A1 | 3/2011 | Forman et al. |
| 2012/0310960 | A1 | 12/2012 | Watanabe et al. |
| 2013/0166557 | A1 | 6/2013 | Fricke et al. |
| 2013/0339472 | A1 | 12/2013 | Ruellan et al. |
| 2014/0025684 | A1 | 1/2014 | Hess |
| 2014/0114934 | A1 | 4/2014 | Chakracorty et al. |
| 2014/0115182 | A1 | 4/2014 | Sabaa et al. |
| 2014/0163958 | A1 | 6/2014 | Chen et al. |
| 2014/0163964 | A1 | 6/2014 | Chen et al. |
| 2014/0344934 | A1 | 11/2014 | Jorgensen |
| 2016/0154861 | A1 | 6/2016 | Hegerty et al. |
| 2016/0283600 | A1 | 9/2016 | Ackerly |
| 2017/0109406 | A1 | 4/2017 | Chavan et al. |
| 2017/0116244 | A1 | 4/2017 | McKenna et al. |
| 2017/0149617 | A1 | 5/2017 | Lee et al. |
| 2017/0154099 | A1 | 6/2017 | Chen et al. |

OTHER PUBLICATIONS

A.G.Alagu Priya et al, "Hierarchical packet classification using a Bloom filter and rule-priority tries", Computer Communications, vol. 33 issue 10, Jun. 15, 2010, pp. 1215-1226.

Georgia Koloniari et al, "Bloom-Based Filters for Hierarchical Data", 2003, University of Ioannina, Greece, pp. 1-19.

Adina Crainiceanu et al, "Bloofi: Multidimensional Bloom filters", Information Systems, Dec. 2015, vol. 54, pp. 311-324.

Manos Athanassoulis et al, "BF-tree: approximate tree indexing", Proceedings of the VLDB Endowment, Oct. 2014, vol. 7 issue 14, pp. 1881-1892.

Yu-Ting Yu et al, "Scalable VANET content routing using hierarchical bloom filters", Wireless Communications and Mobile Computing, 2014, pp. 1001-1014.

Christopher Bonnett, "Classifying e-commerce products based on images and text", Adventures in Machine Learning, Jun. 2016.

Lexiao Tian et al, "Image Classification Based on the Combination of Text Features and Visual Features", International Journal of Intelligent Systems, 2013, vol. 28, pp. 242-256.

Adam W. Harley et al, "Evaluation of deep convolutional nets for document image classification and retrieval", Feb. 2015.

Gerhard Paass et al, "Machine Learning for Document Structure Recognition", Studies in Computational Intelligence, 2011, pp. 1-21.

Jianying Hu et al, "Document Classification using Layout Analysis", Conference: Database and Expert Systems Applications, 1999.

Cohen, Jonathan D. "Hardware-assisted algorithm for full-text large-dictionary string matching using n-gram hashing." Information processing & management 34.4 (1998): 443-464.

Wang, Yi, et al. "Namefilter: Achieving fast name lookup with low memory cost via applying two-stage bloom filters." INFOCOM, 2013 Proceedings IEEE. IEEE, 2013.

Poon, Hoi Ting, and Ali Miri. "Fast phrase search for encrypted cloud storage." IEEE Transactions on Cloud Computing (2017).

Talbot, et al. "Smoothed Bloom filter language models: Tera-scale LMs on the cheap." Proceedings of the 2007 Joint Conference on Empirical Methods in Natural Language Processing and Computational Natural Language Learning (EMNLP-CoNLL). 2007.

Bloom, Burton H. "Space/time trade-offs in hash coding with allowable errors." Communications of the ACM 13. 7 (1970): 422-426.

TOKEN MATCHING IN LARGE DOCUMENT CORPORA

CROSS-REFERENCE TO RELATED APPLICATIONS

This application is a continuation of U.S. patent application Ser. No. 16/108,497, filed Aug. 22, 2018, entitled "Token Matching in Large Document Corpora", the contents of which is incorporated by reference as if fully set forth herein in its entirety.

BACKGROUND

The invention relates to the field of machine learning.

Text analytics, or the extraction of structured information from large amounts of unstructured data, is becoming an important aspect in today's enterprise. A common task in text analytics is 'dictionary matching' (DM), which is the detection of particular sets of words and patterns in unstructured text. With the ever growing amount of unstructured text data, such as emails, web entities, and machine data logs, performing the task of DM in a computationally-efficient way is becoming increasingly important. However, it is often the case that DM operators make up a significant time-consuming portion of text analytics, because these operators scan the text corpora, whereas subsequent steps work on the results and parts of documents only. Accordingly, reducing the computing and memory requirements in the task of DM can be highly valuable.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

There is provided, in some embodiments, a method comprising, in a populating stage, receiving a dictionary comprising a plurality of entities, wherein each entity has a length of between 1 and n tokens; automatically constructing a probabilistic data representation model comprising n Bloom filter (BF) pairs, wherein each BF pair is indexed from 1 to n; automatically populating said probabilistic data representation model with a data representation of said entities, wherein, with respect to each BF pair indexed i: (i) a first BF in said BF pair is populated with the first i tokens of all said entities having at least i+1 tokens, and (ii) a second BF in said BF pair in populated with all said entities having exactly i tokens; in a matching stage, receiving a text corpus, wherein said text corpus is segmented into tokens; and automatically matching each token in said text corpus against said populated probabilistic data representation model, wherein said matching comprises sequentially querying each said BF pair in the order of said indexing, to determine a match.

There is also provided, in some embodiments, a system comprising at least one hardware processor; and a non-transitory computer-readable storage medium having stored thereon program instructions, the program instructions executable by the at least one hardware processor to: in a populating stage, receive a dictionary comprising a plurality of entities, wherein each entity has a length of between 1 and n tokens; automatically construct a probabilistic data representation model comprising n Bloom filter (BF) pairs, wherein each BF pair is indexed from 1 to n; automatically populate said probabilistic data representation model with a data representation of said entities, wherein, with respect to each BF pair indexed i: (i) a first BF in said BF pair is populated with the first i tokens of all said entities having at least i+1 tokens, and (ii) a second BF in said BF pair in populated with all said entities having exactly i tokens; in a matching stage, receive a text corpus, wherein said text corpus is segmented into tokens; and automatically match each token in said text corpus against said populated probabilistic data representation model, wherein said matching comprises sequentially querying each said BF pair in the order of said indexing, to determine a match.

There is further provided, in some embodiments, a computer program product comprising a non-transitory computer-readable storage medium having program instructions embodied therewith, the program instructions executable by at least one hardware processor to: in a populating stage, receive a dictionary comprising a plurality of entities, wherein each entity has a length of between 1 and n tokens; automatically construct a probabilistic data representation model comprising n Bloom filter (BF) pairs, wherein each BF pair is indexed from 1 to n; automatically populate said probabilistic data representation model with a data representation of said entities, wherein, with respect to each BF pair indexed i: (i) a first BF in said BF pair is populated with the first i tokens of all said entities having at least i+1 tokens, and (ii) a second BF in said BF pair in populated with all said entities having exactly i tokens; in a matching stage, receive a text corpus, wherein said text corpus is segmented into tokens; and automatically match each token in said text corpus against said populated probabilistic data representation model, wherein said matching comprises sequentially querying each said BF pair in the order of said indexing, to determine a match.

In some embodiments, each said BF pair has a specified number of hash functions, and wherein said specified number is equal to an optimal number calculated to minimize an error probability.

In some embodiments, said specified number is less than said optimal number. In some embodiments, said specified number further decreases when said indexing of said BF pairs increases.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

Disclosed herein are a method, system, and computer program product for automated, fast, and efficient matching of a dictionary of entities against large text corpora, using sequential probabilistic data representations of dictionary entities. The disclosed method is highly accurate and capable of large-scale matching operations, while reducing time, memory, and computational resources requirements.

Figure 1A:
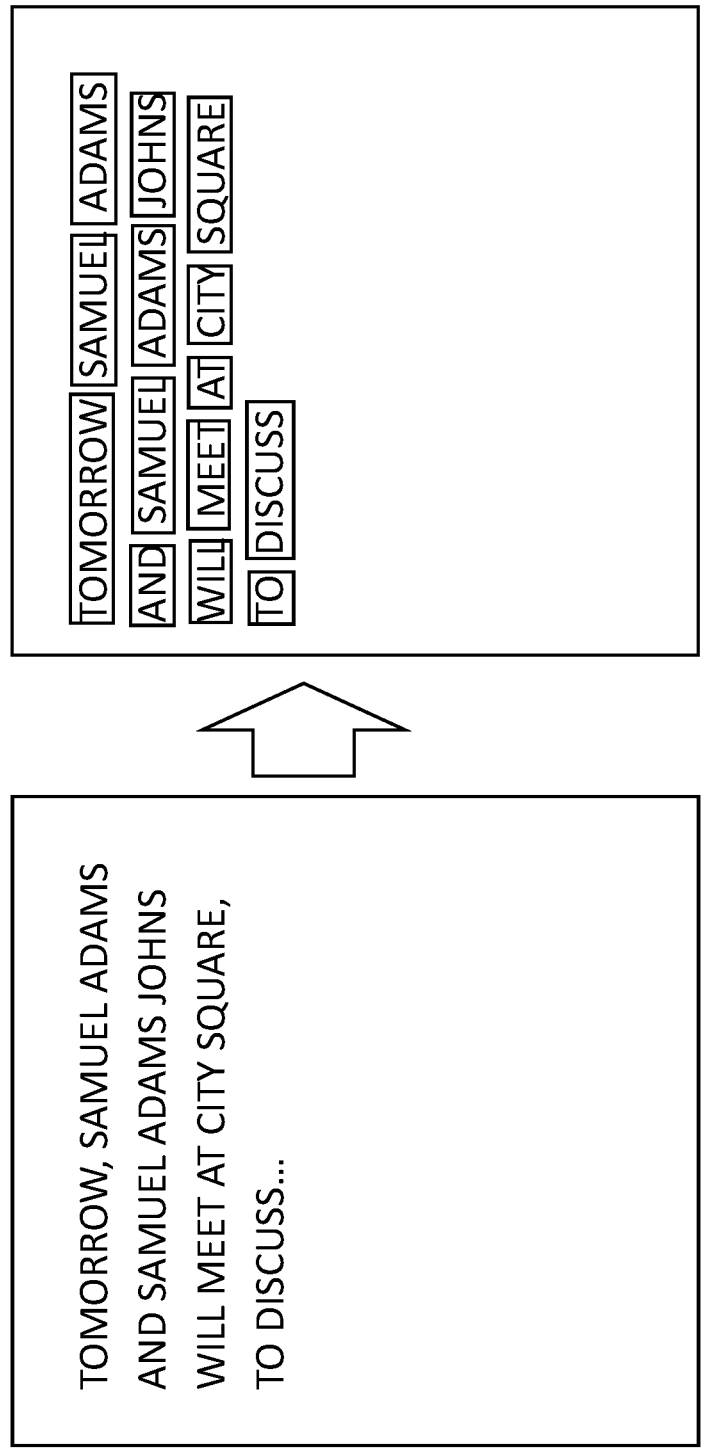
FIG. 1A illustrates a document tokenization process.

As used herein, 'dictionary matching' (DM), also referred to as 'token matching,' is the task of finding all occurrences of a given token in a text. The most basic instance of this problem is the exact token matching problem, i.e., the problem of finding all exact occurrences of the pattern in a text. Approximate token matching (also known as fuzzy token matching) is the technique of finding approximate matches of the pattern. Typically, before DM is performed on a text corpus, a preprocessing stage of 'tokenization' is performed, which segments the text into, e.g., words and sentences. A token may be defined as an instance of a sequence of characters in a document that are grouped together as a useful semantic unit for processing. The tokenization process can be done by splitting the text, e.g., at whitespaces, as shown in FIG. 1A, while getting rid of certain punctuation marks. In other cases, tokenization may comprise additional strategies for dealing with special characters or more complex patterns, e.g., apostrophes, hyphenation, possessions, abbreviations, and contractions. The output of the tokenizer may be a set of tuples, each consisting of a start and end offset of a token within the text data.

Figure 1B:
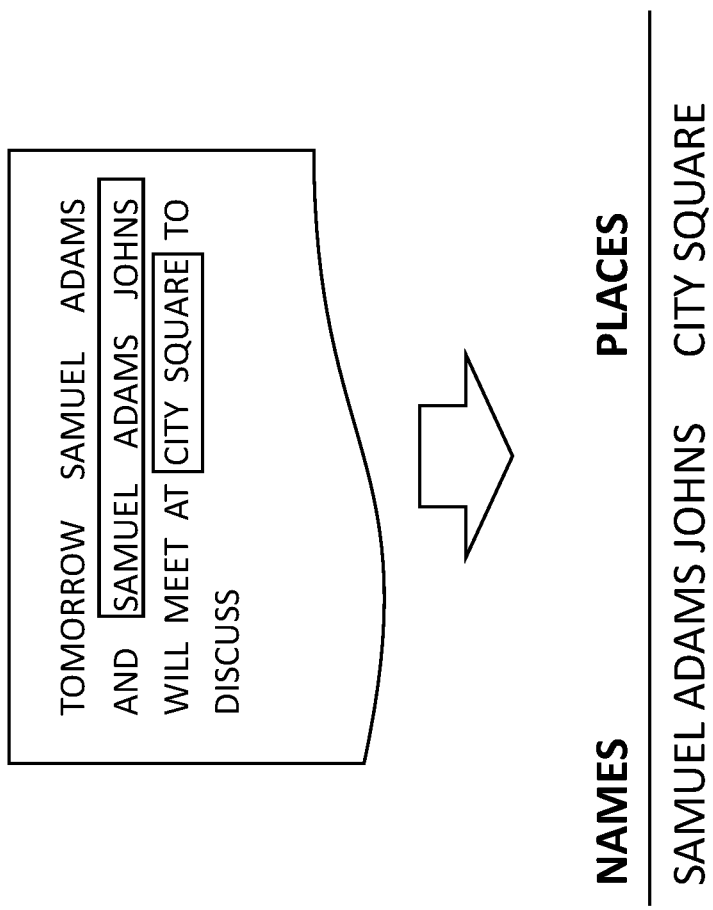
FIG. 1B illustrates a multi-gram token matching process.

Patterns consisting of a sequence of tokens are referred to as multi-token patterns. For example, as illustrated in FIG. 1B, in a dictionary comprising individuals' full names, two separate dictionary entities may be 'Samuel Adams' and 'Samuel Adams Johns.' When a text input contains the string 'Samuel Adams Johns,' the DM task is expected to return a match of the full name only, while rejecting the false positive of 'Samuel Adams' as a possible match.

As noted above, the task of DM typically is very memory-extensive, because the operation must keep and scan large text corpora in memory to find all possible matches. The memory requirements of the DM task may become even more complex when multi-token pattern matching is required, and when strings containing sub-strings which may match separate dictionary entities, as illustrated in FIG. 1B.

Accordingly, in some embodiments, the present invention uses a combination of space-efficient probabilistic data representations, to maintain low memory requirements and low error rates when scaling up the sizes of the dictionary and/or text corpora. In some embodiments, a specific sequential structure of pairs of Bloom and/or similar filters may be used for storing probabilistic data representations for each token in a dictionary, wherein the filter pairs are interdependent in a way that is configured for reducing the number of calculations and false-positive errors during querying of the data structure.

The following discussion will focus on the use of sequential interdependent pairs of Bloom filters (BF) to store a probabilistic representation of a large amount of entities. However, in various embodiments, a different structure of Bloom filters, different types of Bloom filters, and/or different types of other probabilistic data representation filters and/or models may be used.

BFs are a way of using hash transforms to determine set membership, and are particularly useful where fast set membership tests on large data sets are required, such as textual analysis and DM tasks. Because a BF is a probabilistic method, it has an error rate, which only occurs on the side of inclusion (i.e., false positive errors)—a true member will never be reported as not belonging to a set, but some non-members may be reported as members.

BFs use hash transforms to compute a vector (the filter) that is representative of the data set. Membership in a set may be tested by comparing the results of hashing on the potential members to the vector. For example, a given set S of n element $$S=\{x_1, x_2, \ldots, x_n\}$$

may be represented by an array of m bits B $$B=[b_1, b_2, b_3, b_4, \ldots, b_{m-1}, b_m].$$

Figure 2:
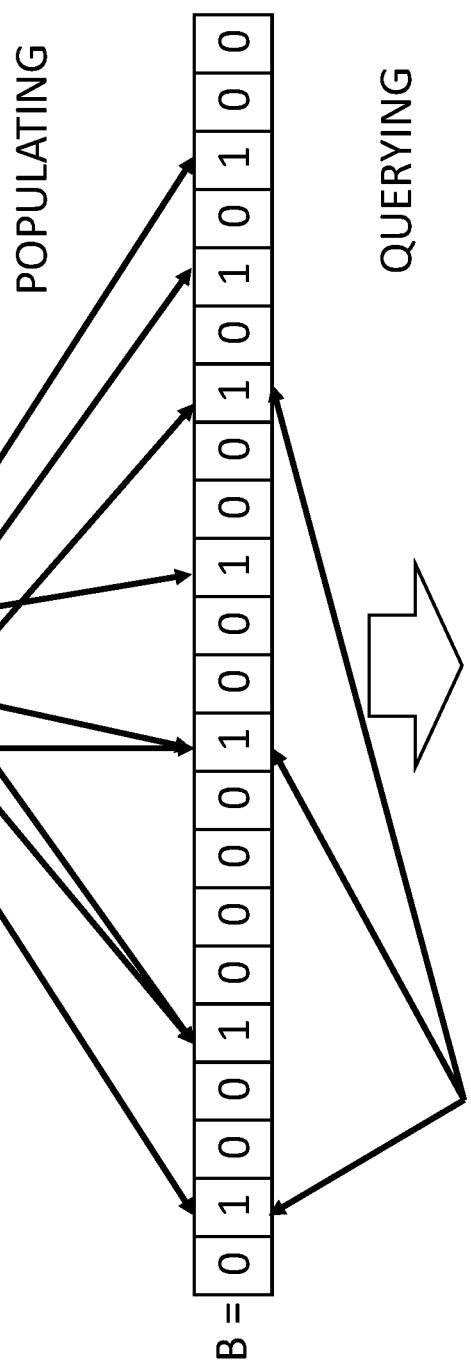
FIG. 2 schematically illustrates the operation of a Bloom filter.

A BF uses k independent hash functions $h_1 \ldots h_k$ that are assumed to be uniformly distributed over the range $\{1, \ldots, m\}$. With reference to FIG. 2, to populate set S, all $S_x \in S$ need to be added to BF B using:

for each $1 \le i \le k, B[h_i(x)]=1$.

During querying, to check if element y is in BF B:

for each $1 \le i \le k$, if all $B[h_i(y)]==1$, return True, otherwise False.

BFs provide an inherent improvement in time efficiency, as a function of the permitted false-positive rate for the task. More specifically, the expected complexity of simple BFs is measured for insertion and querying, and depends on the number of hash functions k allocated for 'storing' by the filter. A simple BF relying on k hash functions would require a fixed constant O(k) amount of time to either populate or query an item in a set, wherein this time constant is independent of the number of items in the set.

Given a single BF using k hash functions, storing n elements in m bits, the expected false-positive probability is then:

$$P_{FP} \approx \left(1 - e^{\frac{kn}{-m}}\right)^k$$

Thus, given a specific value of acceptable false positive rate, the optimal number of hash functions k, as well as the length of bit vector m, can be derived as follows:

$$k = \frac{\ln P_{FP}}{\ln 2},$$

$$m = -\frac{n \ln P_{FP}}{(\ln 2)^2}$$

To illustrate this result, a BF representing a set of 1 million items with a false-positive probability of 0.01 requires only 9,585,059 bits (1.14 MB), and 7 hash functions.

However, for the task of DM, the use of a single BF and/or similar probabilistic data representation to hold all entities simultaneously, imposes a number of limitations:

Significantly higher querying time to match all possible tokens found in the text with all possible tokens of varying lengths in the BF; and large number of redundant calculations, if the existence of tokens containing sub-tokens (as illustrated above with reference to FIG. 1B) is not taken into consideration.

Accordingly, in some embodiments, the present invention provides for employing a structure of sequential BFs, wherein sub-tokenization is taken into account in the populating of the BFs. Compared to a single-BF storage model, the multi-BF, sequential querying model of the present invention provides for a faster populating and querying times, as well as fewer false-positive errors in matching.

Figure 3:
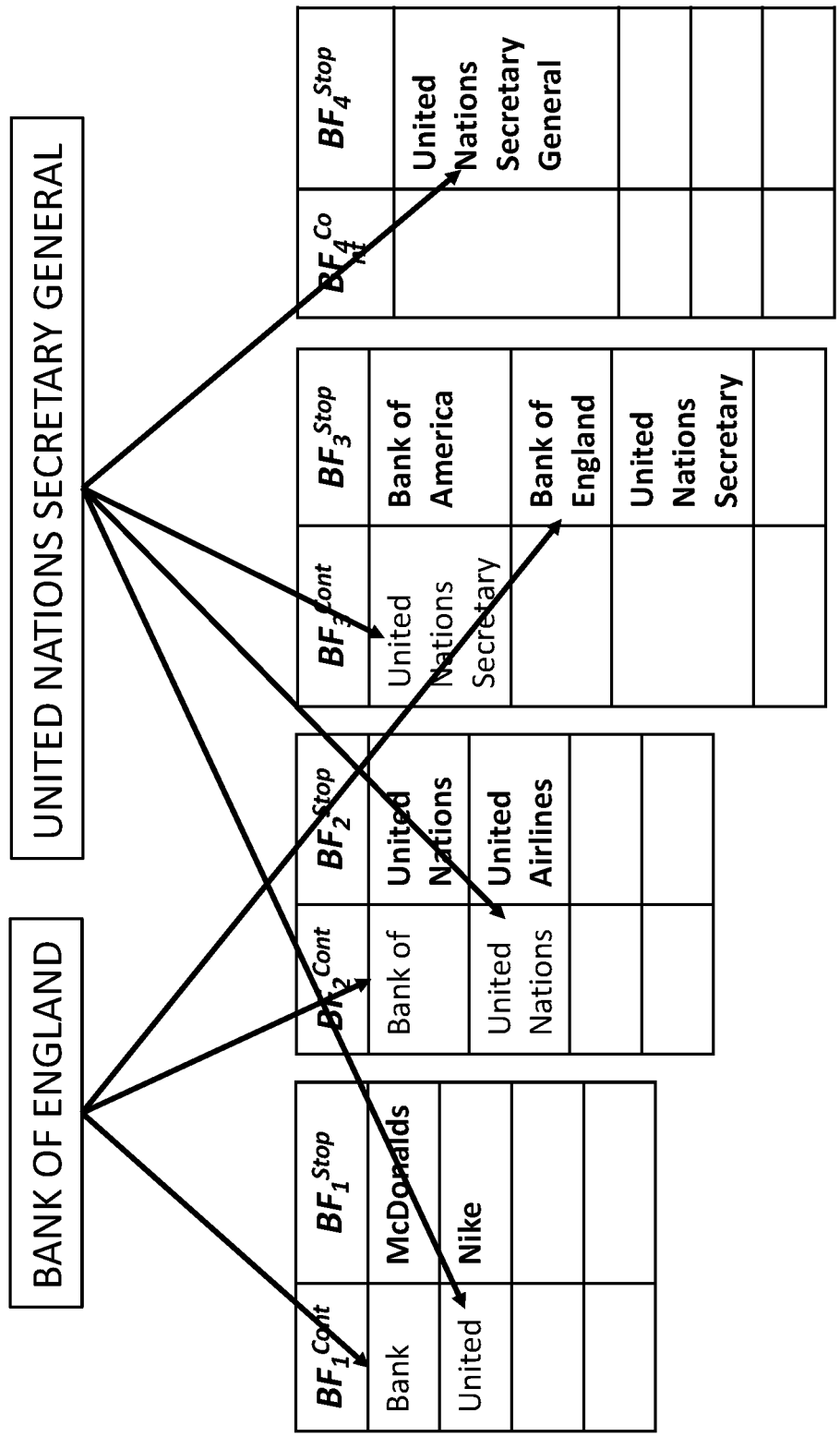
FIG. 3 illustrates a sequential probabilistic data representation comprising Bloom filters pairs, according to an embodiment.

The working principles of the present invention will be detailed with respect to FIG. 3. In an exemplary case of a dictionary with entities having, e.g., a length of between 1 to 4 tokens, the present invention is configured for constructing a BF structure comprising 4 pairs of BFs. For dictionaries comprising entities with different lengths, the number of BF pairs will match the expected longest token length. In some embodiments, the first BF in each pair may be designated as $BF_i^{Cont}$ and the second BF in each pair may be designated $BF_i^{Stop}$, wherein i is an index number equal to 1 through n. As illustrated in FIG. 3, during populating of the BFs:

The first BF in all pairs having an index i of between 1 and (n−1), will be populated with the first i tokens of all the entities having at least n+1 tokens. Thus, for example, in the case of the entity 'Bank of England' (n=3), $BF_1^{Cont}$ will store 'Bank,' and $BF_2^{Cont}$ will store, 'Bank of'; and the second BF in the pair indexed i=n will store all the entities containing exactly n tokens. Thus, for example, $BF_3^{Stop}$ will store 'Bank of England' (n=3).

In some embodiments, once the BFs are populated with all entities as described above, for a given token matching task, the BFs will be queried sequentially, to match all possible entities which begin with the current token. For example, as illustrated in FIG. 3, matching the 3-gram term 'Bank of England' will involve sequentially querying the following BFs:

(i) 'Bank' in $BF_1^{Cont}$;
(ii) 'Bank of' in $BF_2^{Cont}$; and
(iii) 'Bank of England' in $BF_3^{Stop}$.

Similarly, matching the 4-gram term 'United Nations Secretary General' will involve sequentially querying the following BFs:

(i) 'United' in $BF_1^{Cont}$;
(ii) 'United Nations' in $BF_2^{Cont}$;
(iii) 'United Nations Secretary' in $BF_3^{Stop}$; and
(iv) 'United Nations Secretary General' in $BF_4^{Stop}$.

As can be seen, 'higher order' BFs (i.e., those representing longer entities, such as $BF_4^{Cont}$ and $BF_4^{Stop}$) are likely to be queried less frequently due to the relative sparsity of multi-gram tokens.

In some embodiments, the average token-length q* of a given set of tokens may be correlated, at least in part, with both BF populating time and BF querying time, as follows:

Populating: With respect to a single token of length q, there will be an expected q−1 BF insertions to $BF^{Cont}$ filters indexed 0 to q−2, and 1 insertion to all a $BF^{Stop}$ filter, for a total of q insertions to all BFs in the structure.

Querying: With respect to exact matches of tokens of length q, the matching process will query all $BF^{Cont}$ and all $BF^{Stop}$ from 0 to q−1, for a total of 2q queries. With respect to partial matches, the matching process will query all $BF^{Cont}$ and all $BF^{Stop}$ up to the point where the n-gram token is no longer similar. In any event, the total number of queries will be no greater than 2q−1.

Thus, the length of q*, derived directly as the mean q over all tokens, bounds the complexity of both populating and querying of tokens. Moreover, q* is also dependent on the distribution of tokens in the dictionary; multi-length-tokens may have different distribution rates in various dictionaries, some lengths may occur more frequently than others, etc. Similarly, querying times may vary, to some extent, by the distribution of tokens found in the text corpora during tokenization. Ultimately, the expected complexity for both populating and querying is O(k·q*). Because q* typically is expected to be a low fixed number, e.g., between 2 and 3, and in most use-cases not higher than 5, the expected complexity can be presented as O(k).

In some embodiments, the sequential paired BF structure may be further configured for permitting a significant reduction in the number of hash functions k required for representing all entities. Because the main purpose of multiple hash-functions in BFs is to reduce false-positive rate, it may be expected that a querying process comprising a sequence of dependent queries, as disclosed by the present invention, may result in fewer false-positives.

For example, if two single BFs each has a false positive rate of 1%, then the probability of a false-positive return in a query comprising both structures would be 0.1%×0.1%, or ~0.01%. For example, as noted above, with reference to FIG. 3, matching the 3-gram term 'Bank of England' will involve sequentially matching the term through three separate BF: $BF_1^{Cont}$, $BF_2^{Cont}$, and $BF_3^{stop}$. In this case, for a false positive return, all three BFs must return a false positive match. Because each of the BFs has a specific probability for returning a false positive, the likelihood that all three BFs will return a false positive at the same time is significantly reduced.

To take advantage of this overall lowered false positive probability, in some embodiments $BF^{Cont}$ may be structured using a lower number of hash functions, which may result in lower populating and querying times, as noted above.

Moreover, when structuring the BFs, a higher acceptable false positive rate may be assigned to the $BF^{Cont}$ filters as their order increases. For example, when matching a 6-gram token, less stringent false positive rates may be used with $BF_4^{Cont}$ and $BF_5^{Cont}$, because the likelihood of a false match will have already been lowered by preceding chain of sequential queries, and will be further reduced by the false positive rate of $BF_6^{Cont}$. Thus, the overall reduced number of hash functions, as well as the reduced number of tokens to be queried by each structure, compensate in time for the increased number of structures to be queried during token matching.

Figure 4:
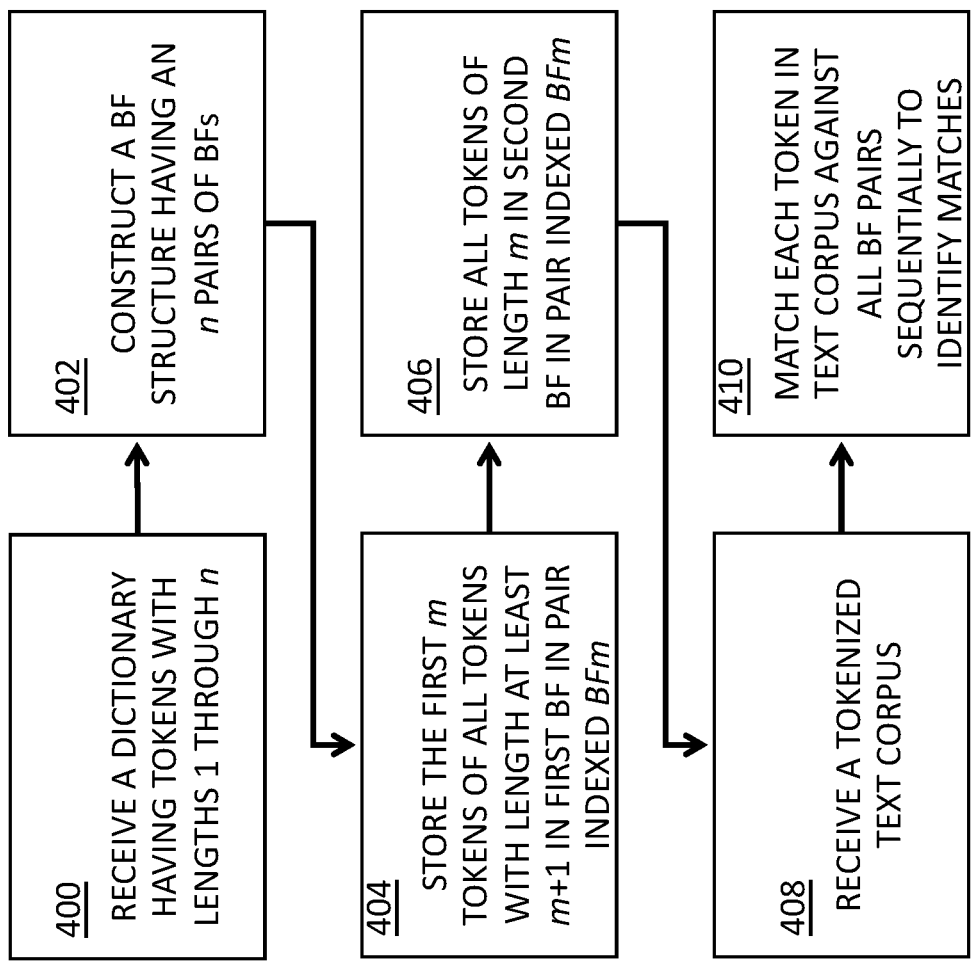
FIG. 4 is a flowchart of the functional steps in a method for automated matching of a dictionary of tokens against large text corpora, using sequential probabilistic data representation, according to an embodiment.

FIG. 4 is a flowchart of a method for automated matching of a dictionary of tokens against large text corpora, using sequential probabilistic data representations. At 400, a dictionary comprising tokens with n-gram lengths 1 through n is received. At 402, a sequential probabilistic data representing structure is constructed, e.g., using n pairs of BFs.

At 404, the first i tokens of all entities having at least i+1 tokens are stored in the first BF in BF pair indexed i. At 406, all entities containing exactly i tokens are stored in the second BF in BF pair indexed i.

In some embodiments, exemplary populating computer program code of the present invention may comprise the following computer instructions:

```
procedure InsertTokenDictIntoBFs(tokens_dict)
    max_order := 0
    for each token in tokens_dict do
        n := token_length(token)      >> token_length(Samuel
        Adams Johns) = 3
        max_order := max(max_order, n)
        for i in range [0, n - 2] do
            token[0, i] → BF_i^Cont
        end for
        token[0, n - 1] → BF_{n-1}^Stop
    end for
    Return {BF_i^Cont, BF_i^Stop}_{i=0}^{max_order}
end procedure
```

At 408, tokens from a tokenized text corpus are received. At 410, each text corpus token is matched against the BF structure sequentially, to identify matches. In some embodiments, exemplary querying computer program code of the present invention may comprise the following computer instructions:

```
procedure ParseDoc( (tokens_in_doc)
    matched_tokens_in_doc := 0
    for i in range [0, len(tokens_in_doc)-1] do
        longest_matched_token := None
        for j in range [0, max_order-1] do
            matched_token :=
                BF_j^Stop.Query(tokens_in_doc[i, i+j])
            if matched_token ≠ None :
                longest_matched_token = matched_token
            if BF_j^Cont.Query(tokens_in_doc[i, i+j]) = None :
                longest_matched_token →
                matched_token_in_doc
                break;
        end for
        longest_matched_token → matched_token_in_doc
    end for
    Return matched_token_in_doc
end procedure
```

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Rather, the computer readable storage medium is a non-transient (i.e., not-volatile) medium.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
    receiving, by a server, a dictionary comprising a plurality of entities, wherein each entity has a length of between 1 and n tokens;
    automatically constructing, by the server, a probabilistic data representation model comprising n Bloom filter (BF) pairs, wherein each BF pair is indexed from 1 to n;
    automatically populating, by the server, the probabilistic data representation model with a data representation of the plurality of entities;
    receiving, by the server, a text corpus that is segmented into tokens; and
    automatically matching, by the server, each token in the text corpus against the populated probabilistic data representation model.

2. The method of claim 1, wherein, with respect to each BF pair indexed i, a first BF in the BF pair is populated with first i tokens from the plurality of entities having at least i+1 tokens, and a second BF in the BF pair in populated with all from the plurality of entities having exactly i tokens.

3. The method of claim 1, wherein the matching further comprises sequentially querying each BF pair in order of the indexing from 1 to n, to determine a match.

4. The method of claim 1, wherein each BF pair has a specified number of hash functions, each specified number being equal to an optimal number calculated to minimize an error probability.

5. The method of claim 1, wherein each BFP pair has a specified number of hash functions, each specified number being less than an optimal number calculated to minimize an error probability.

6. The method of claim 1, wherein each BF pair has a specified number of hash functions, each specified number being less than an optimal number calculated to minimize an error probability, the specified number further decreasing as the indexing of the BF pairs increases.

7. A computing device comprising:
    a memory containing machine readable medium comprising machine executable code having stored thereon instructions for performing a method of token matching;
    a processor coupled to the memory, the processor configured to execute the machine executable code to cause the processor to:
        receive a dictionary comprising a plurality of entities, wherein each entity has a length of between 1 and n tokens;
        automatically construct a probabilistic data representation model comprising n Bloom filter (BF) pairs, wherein each BF pair is indexed from 1 to n;
        automatically populate the probabilistic data representation model with a data representation of the plurality of entities;
        receive a text corpus that is segmented into tokens; and
        automatically match each token in the text corpus against the populated probabilistic data representation model.

8. The computing device of claim 7, wherein, with respect to each BF pair indexed i, a first BF in the BF pair is populated with first i tokens from the plurality of entities having at least i+1 tokens, and a second BF in the BF pair in populated with all from the plurality of entities having exactly i tokens.

9. The computing device of claim 7, the machine executable code further causing the processor to: wherein said matching comprises sequentially query each BF pair in order of the indexing from 1 to n, to determine a match.

10. The computing device of claim 7, wherein each BF pair has a specified number of hash functions calculated to minimize an error probability.

11. The computing device of claim 7, wherein BF pair has a specified number of hash functions, each specified number being less than an optimal number calculated to minimize an error probability.

12. The computing device of claim 7, wherein each BF pair has a specified number of hash functions, each specified number being less than an optimal number calculated to minimize an error probability, the specified number further decreasing as the indexing of the BF pairs increases.

13. A non-transitory machine readable medium having stored thereon instructions for performing a method comprising machine executable code which when executed by at least one machine, causes the machine to:
    receive a dictionary comprising a plurality of entities, wherein each entity has a length of between 1 and n tokens;

automatically construct a probabilistic data representation model comprising n Bloom filter (BF) pairs, wherein each BF pair is indexed from 1 to n;

automatically populate the probabilistic data representation model with a data representation of the plurality of entities;

receive a text corpus that is segmented into tokens; and automatically match each token in the text corpus against the populated probabilistic data representation model.

14. The non-transitory machine readable medium of claim 13, wherein, with respect to each BF pair indexed i, a first BF in BF pair is populated with first i tokens from the plurality of entities having at least i+1 tokens, and a second BF in the BF pair in populated with all from the plurality of entities having exactly i tokens.

15. The non-transitory machine readable medium of claim 13, further comprising machine executable code that causes the machine to: sequentially query each BF pair in order of the indexing from 1 to n, to determine a match.

16. The non-transitory machine readable medium of claim 13, wherein each BF pair has a specified number of hash functions, each specified number being equal to an optimal number calculated to minimize an error probability.

17. The non-transitory machine readable medium of claim 13, wherein each BF pair has a specified number of hash functions each being less than an optimal number calculated to minimize an error probability.

18. The non-transitory machine readable medium of claim 13, wherein each BF pair has a specified number of hash functions, each specified number being less than an optimal number calculated to minimize an error probability, the specified number further decreasing as the indexing of the BF pairs increases.

* * * * *